United States Patent Office 3,629,387
Patented Dec. 21, 1971

3,629,387
PROCESS FOR PRODUCING IMPROVED IMPACT-RESISTANT POLYSTYRENE FILMS
Takeshi Watanabe, Kamakura, Masatsugu Yoshida and Takaichi Akutagawa, Yokohama, and Shiro Noguchi, Hiratsuka, Japan, assignors to Mitsui Toatsu Chemicals, Incorporated, Tokyo, Japan
Filed Apr. 14, 1969, Ser. No. 815,900
Claims priority, application Japan, Apr. 16, 1968, 43/25,145; Oct. 12, 1968, 43/73,907
Int. Cl. B29c 17/07; B29d 23/04; C08f 19/04
U.S. Cl. 264—209                10 Claims

ABSTRACT OF THE DISCLOSURE

Process for producing continuously in a stable operation improved, rubber-modified polystyrene films which are high in tensile strength, impact strength, tearing strength, transparency and surface smoothness and which are very readily thermoformed comprising extruding a rubber-modified polystyrene in which the amount of contained rubber and the particle size of the rubber, a copolymer of this rubber and a vinyl aromatic compound or a mixture of the rubber and copolymer contained by the polystyrene are in a specified relationship, using special extrusion conditions in a tubular-film extrusion process which includes biaxially stretching under specified conditions.

BACKGROUND OF THE INVENTION (a) Field of the invention

This invention relates to a process for producing, continuously in a stabilized operation, improved, rubber-modified polystyrene films which are substantially transparent, are excellent in smoothness of surface and are improved in such mechanical properties as tensile strength, impact strength and tearing strength.

(b) Description of the prior art

The major limitation of the unmodified polystyrenes is low practical toughness. In attempts to overcome this, processes were developed in about 1946 for incorporating styrene-butadiene rubber (GRS) into styrene. This was done by mechanical mixing of the components, either at a certain rubber level, or to produce a concentrate for further styrene dilution in conventional extrusion equipment. These compounds, known as poly blends, contained excessive amounts of rubber in comparison with today's graft polymers. They were characterized by poor thermal stability (rubber burn-out), processing sensitivity (due to rubber heterogeneity), and poor elongation. Most impact styrenes available today are graft polymers; that is, the styrene monomer is polymerized directly onto the rubber. The impact styrenes, in general, have the same chemical resistance as the normal polystyrenes, but have a rather porous rubber phase which allows a higher rate of permeation. The net effect is that the impact styrenes have a tendency to swell rather than craze or fracture.

The impact-resistant polystyrenes can be extruded reasonably well on most machines. Sheeting dies usually have been constructed especially for styrene work. They featured fish tail adapters, movable die lips, and restrictor bars.

Sheet stock usually has been produced by the chill roll method in which the hot melt is extruded through the die lips and fed through an S-wrap roll system. The highly polished rolls are temperature controlled and impart a high gloss to the sheet by heat and pressure. Grained or matte finishes can also be produced by special rolls at this point. Still higher gloss can be achieved by passing the sheet through an infra-red glazing unit located between the die lips and roll system.

The thermoforming characteristics of impact-resistant polystyrenes have led to the development of tremendous markets for these materials in the packaging and refrigeration industries.

Heretofore, polystyrene films have been obtained by a T-die process in which molten polystyrene is extruded flat. The films produced by the T-die process have disadvantages in such mechanical properties as tensile strength, impact strength and tearing strength irrespective of the extrusion conditions. Therefore, as an effort in improving the above-mentioned physical properties of polystyrenes, it has been attempted to produce rubber-modified polystyrene films by a T-die process by using rubber-modified polystyrene in which 5 to 15% by weight of rubber material was incorporated and the rubber material was dispersed in a particle size of 1 to 10 microns in the polystyrene.

However, the film obtained by the T-die process from the above-mentioned rubber-modified polystyrene was improved to a certain extent in impact strength and tearing strength depending on the choice of the extrusion conditions but had the disadvantages of a remarkably low tensile strength irrespective of the extrusion conditions, a semitransparent and milk-white appearance, a very low transparency, a rough surface and a generally poor appearance.

Methods have been studied for improving such mechanical properties as described above by biaxially orienting the film by a tubular-film extrusion process wherein the polystyrene is melted and is extruded as a tube and a gas such as air is forced into this tubular film to expand it and orient it in the lateral direction and at the same time in the longitudinal direction or machine direction. However, we have found, in the case of producing biaxially oriented films by the above-mentioned tubular-film extrusion process, that, irrespective of the extrusion conditions used, it is difficult to carry out the process continuously in a stable operation and the improvement in mechanical properties of the obtained film is insufficient.

A tenter process, wherein a flat polystyrene sheet 10 to 15 times as thick as the thickness of the desired polystyrene film product is extruded through a T-die and is stretched and oriented by a tenter in the longitudinal direction and lateral direction consecutively or simultaneously, has been adopted in an attempt to improve the mechanical properties of polystyrene. However, the production of films having a balanced orientation in both axial directions by the tenter process has disadvantages in that (1) it is necessary to use a very complicated apparatus and the operation is not easy, (2) nonuniform stretches are so likely to be given to the peripheries on both sides of the sheet that it is necessary to remove that part of the film having a nonuniform thickness, because it is poor in value, as a product and, therefore, the yield of the product is reduced and the process is not economical and (3) the above-mentioned parts of the sheet that are gripped are likely to tear and break as it is being stretched. Furthermore, the applicable range of forming conditions when thermoforming the polystyrene film obtained as mentioned above is much narrower and more critical than in thermoforming the film produced by the present invention and therefore its formability is very low.

Therefore, it is generally very difficult to thermoform the product obtained by the tenter process with an inexpensive forming machine of simple construction, for example, a thermoforming machine of the radiation heating type. In this respect, too, the tenter process is deficient in industrial practicability.

BRIEF DESCRIPTION OF THE DRAWING

In FIG. 1, the vertical lines relate to the examples herein as follows:

Example 1 is designated by $a$
Example 2 is designated by $b$
Example 3 is designated by $c$
Example 4 is designated by $d$
Example 5 is designated by $e$
Example 6 is designated by $a$
Example 8 is designated by $a$
Example 9 is designated by $c$
Example 10 is designated by $f$
Example 11 is designated by $g$

Figure 2:
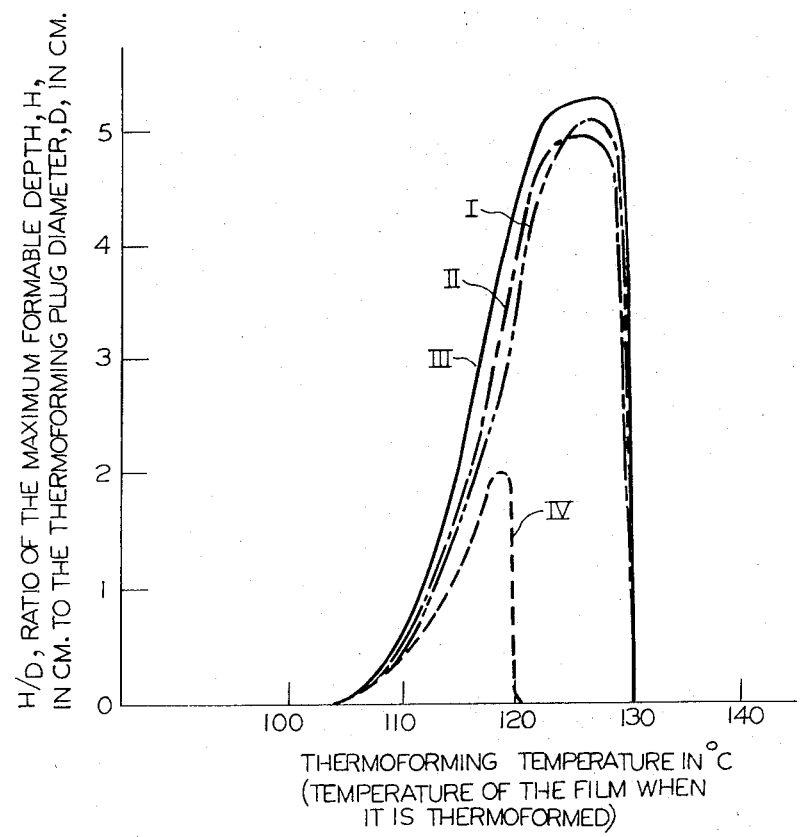
FIG. 2 is a biaxial graph of the ratio of the maximum formable depth, H, in cm. to the thermoforming plug diameter, D, in cm. versus the film temperature during the thermoforming and illustrates four curves representing thermoforming test results on four films identified as follows.
Figure 3:
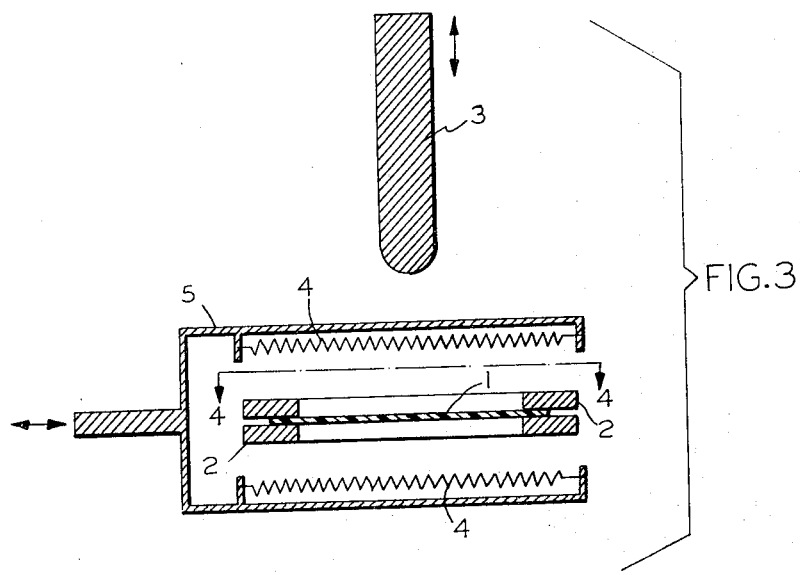
Figure 4:
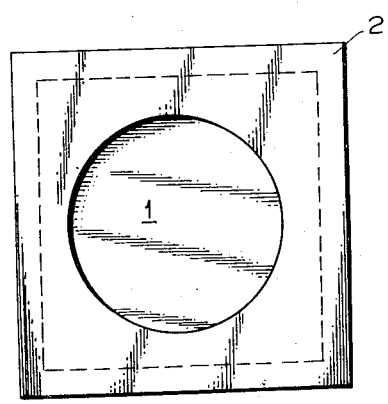

Curve I relates to Example 1;
Curve II relates to Example 2;
Curve III relates to Example 5;

Curve IV relates to a biaxially oriented polystyrene film made by using a tenter process which is not a part of the invention but is provided for comparative purposes;

FIG. 3 is a diagrammatic side elevation in section of the apparatus used to measure the thermoformability of films to provide the test results given in FIG. 2 showing the film in the heating position;

FIG. 4 is a plan view taken on line 4—4 of FIG. 3; and

Figure 5:
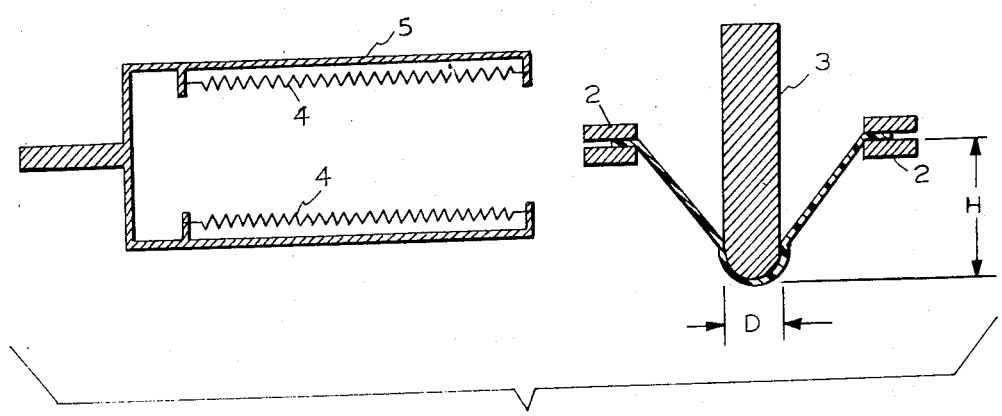

FIG. 5 is a diagrammatic side elevation in section of the apparatus shown in FIG. 3 illustrating the film in thermoforming position and showning the D and H measurements.

SUMMARY OF THE INVENTION

As a result of extensive research in the production of polystyrene films, biaxially oriented by a tubular-film extrusion process, we have discovered a very practical method of continuously producing film in a stable operation whereby biaxially oriented films are produced in which such disadvantages as described above for the prior art processes are eliminated and which are substantially transparent, are high in surface smoothness, are remarkably improved in such mechanical properties as described above and are very easily thermoformed.

Figure 1:
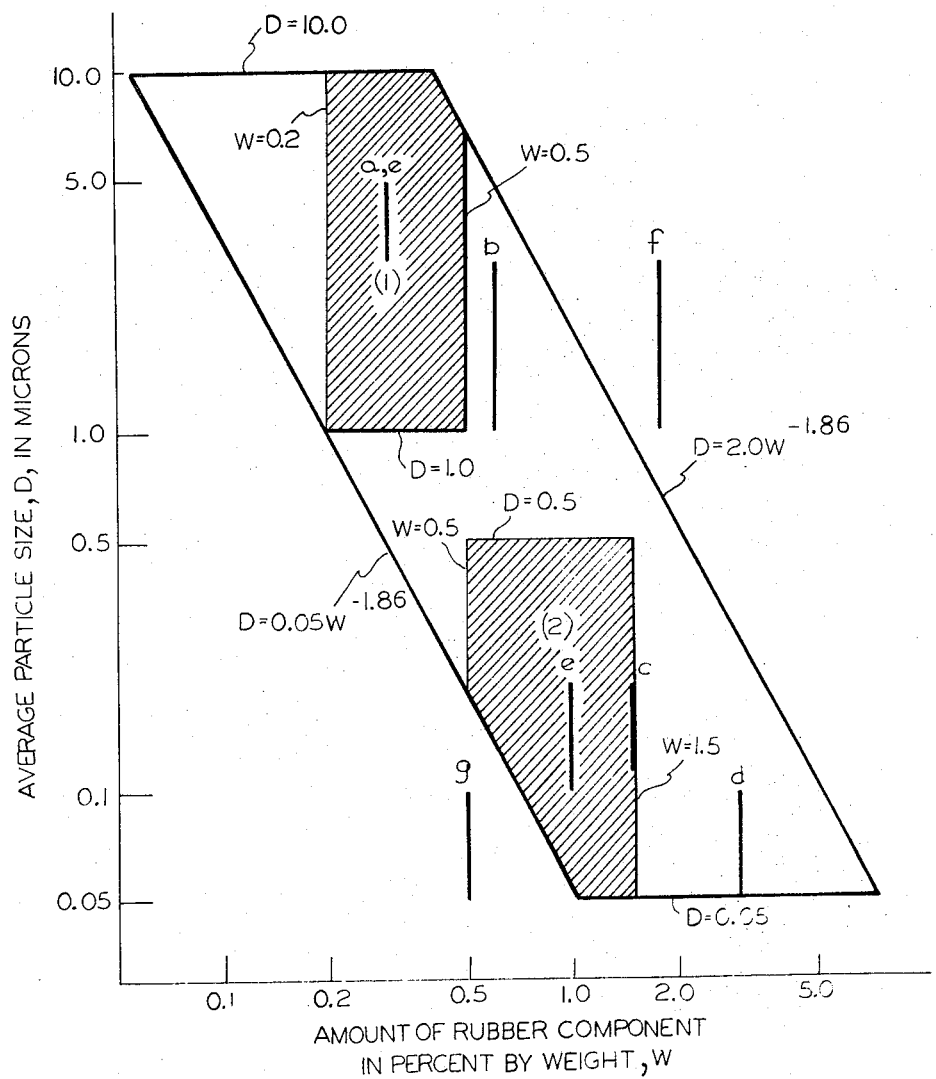
FIG. 1 is a biaxial logarithmic graph of the amount, W, in percent by weight of the rubber component versus the average particle size, D, in microns of rubber-containing particles in the rubber-modified, impact-resistant polystyrene compositions used in the present invention.

The present invention comprises an improved process for producing improved rubber-modified, impact-resistant polystyrene films characterized by extruding, as a tubular film at an extrusion temperature of 160 to 200° C., a rubber-modified polystyrene composition containing an amount in weight percent, W, of rubber in particles having an average particle size, D, falling in the area of a biaxial logarithmic plot of W versus D defined by the respective lines $D=10.0$, $D=0.05$, $D=0.05W^{-1.86}$ and $D=2.0W^{-1.86}$ which form the quadrangle shown in FIG. 1, and biaxially stretching the tubular film at a rate of 50 to 200% per second while it is at a temperature of 90 to 130° C.

The rubber component in the rubber-modified polystyrene of the present invention can be any rubber component employed hereinbefore in the manufacture of impact-resistant polystyrenes and preferably is (1) a substantial homopolymer of a conjugated diolefin, such as a polybutadiene rubber or a polyisoprene rubber, (2) a copolymer of a conjugated diolefin, such as butadiene or isoprene, (a) in an amount of about 40 to about 95 weight percent and (b) in an amount of about 60 to about 5 weight percent, styrene alone, such as a styrene-butadiene rubber (SBR), or styrene mixed in a major amount with any other copolymerizable monovinyl aromatic compound other than styrene, such as vinyl toluene or alpha-methylstyrene or (3) a mixture of (1) and (2).

The particles to which the average particle size, D, refers are particles containing the above-described rubber component, and these rubber-containing particles as uniformly dispersed throughout the styrene polymer matrix, can comprise (A) at least one of the above-described rubbers (1), (2) and/or (3), (B) at least one graft copolymer of at least one of the rubbers (1), (2) and (3) and styrene or a mixture of styrene as the major component with another monovinyl aromatic compound or (C) a mixture of at least one of the rubbers (A) and at least one graft copolymer (B) mentioned above.

The styrene polymer employed is usually (I) a homopolymer of styrene or
(II) a copolymer of styrene as a major component with any other copolymerizable monovinyl aromatic compound other than styrene, for example, alpha-methylstyrene or vinyltoluene.

Therefore, as evident from the above explanation, the rubber-modified polystyrene of this invention comprises the styrene polymer described above and a rubber, a copolymer of the rubber and a monovinyl aromatic compound containing a major amount of styrene or a mixture of the rubber and the copolymer.

The average particle size of rubber particles used herein is given as the largest dimension of the particles of rubber, the copolymer or the mixture of the rubber and the copolymer all as described above. The average particle size is measured by microscopic photograph of the rubber-modified polystyrene. In the rubber-modified polystyrene to be used in the invention of the present application, the above-described styrene polymer forms a continuous phase throughout which the rubber particles are dispersed.

The rubber-modified polystyrene used in this invention can be easily prepared by any suitable method. For example, it can be prepared (1) by polymerizing styrene alone or mixed with a monovinyl aromatic compound in the presence of the above-mentioned rubber using usual polymerization procedures. Alternatively it can be made (2) by melting, mixing and dispersing the above-mentioned rubber in molten styrene polymer of the type described above or it can be made (3) by melting, mixing and dispersing the composition obtained by process (1) above in the molten styrene polymer. The average particle sizes of the rubber particles containing the above-mentioned rubber in the novel rubber-modified polystyrene is adjusted to be 0.05 to 10 microns as defined in the present invention by any suitable process for each of the above-mentioned processes. For example, sufficiently vigorous agitation of the rubber component in the styrene or molten styrene polymer will disperse the rubber component in finely divided form of suitable particle sizes within the above-mentioned range. The desired particle size is maintained when the viscosity of the styrene polymer increases adequately by continued polymerization or cooling. Particularly in the above described case (2), when a styrene-butadiene block copolymer rubber is used as the rubber component, it is comparatively easy to adjust the above-mentioned average particle size to be 0.05 to 0.5 micron. Other methods for adjusting the particle size of the rubber component can be used.

When the amount of the above-mentioned rubber component in the novel rubber-modified polystyrene is lower or the particle size of the rubber component is smaller than are respectively defined in the present invention, that is, they are respectively below the two straight lines of $D=0.05$ and $D=0.05W^{-1.86}$ shown in FIG. 1 and are thus outside of the present invention, no excellent effects of adding the rubber component can be developed. Such mechanical properties as the impact strength and tear strength are not improved and it is difficult to produce biaxially oriented films in a continuous, stable operation.

On the other hand, when the amount of the above-mentioned rubber component is higher or the above-mentioned particle size of the rubber component is larger than are respectively defined in the present invention, that is, they are respectively above the two straight lines of $D=10.0$ and $D=2.0W^{-1.86}$ shown in FIG. 1 and are outside of the present invention, the tensile strength is low, the transparency is low, the smoothness of the surface is very poor and generally the results are not desirable in practice.

Now, in the present invention, when a rubber-modified polystyrene in which the amount of the above-mentioned rubber component and the average particle sizes of the rubber particles fall within the below-defined areas of a logarithmic graph of W versus D and the extrusion conditions defined in the present invention are used, the properties of the obtained film become comparatively uniform and are greatly improved and such rubber-modified polystyrene compositions are preferred.

(1) the area of hatching shown at (1) in FIG. 1 which is enclosed by the respective lines of $D=10.0$, $D=1.0$, $W=0.2$, $W=0.5$ and $D=2.0W^{-1.86}$ and
(2) the area of hatching shown at (2) in FIG. 1 which is enclosed by the respective lines of $D=0.5$, $D=0.05$, $W=0.05$, $W=1.5$ and $D=0.05W^{-1.86}$.

When a biaxially oriented film is produced in the manner defined by the present invention, there is obtained in a continuous, stable operation a biaxially oriented film which is substantially transparent, is excellent in surface smoothness, is remarkably improved in the physical properties and is very easily thermoformed. In order to clarify the importance of the present invention on this point, the present invention shall be explained below in relation to the extrusion conditions defined thereby.

According to investigations made by the present inventors, when producing a biaxially oriented polystyrene film by the tubular film extrusion process, it is effective in the improvement of the physical properties of the film to carry out the biaxial orientation at a temperature of the tubular film, being stretched simultaneously in the longitudinal direction and lateral direction, in the range above the second order transition temperature but below the softening temperature of the polystyrene composition, that is in the range of about 90 to about 130° C. and at a biaxial stretching rate of more than 200% per second. However, in order to biaxially orient it under the above-mentioned conditions, the temperature of the molten polystyrene immediately before it is extruded to be tubular must be in the range of 160 to 200° C. which is at the lower part of the range of 160 to 280° C. which is generally used for polystyrenes. Furthermore, as the tubular polystyrene film extruded at such low extrusion temperatures is pulled at the above-mentioned stretching rate, simultaneously in both longitudinal and lateral directions, there are produced the disadvantages that the tubular polystyrene film is broken or torn in places and, since the form of the inflated tubular polystyrene film therefore is not stabilized, the fluctuations in the thickness of the obtained polystyrene film is large. Thus, it is very difficult to produce polystyrene films in a stabilized operational state. Also, no improvement of the physical properties of the polystyrene film can be recognized.

However, when producing a biaxially oriented film by the tubular-film extrusion process using a rubber-modified polystyrene composition in accordance with the present invention, if the molten rubber-modified polystyrene is extruded as a tubular film in the extrusion temperature range of about 160 to about 200° C. defined in the present invention and the tubular film is biaxially oriented while at a temperature in the range of about 90 to about 160° C. and while stretching simultaneously in the longitudinal direction and the lateral direction at a biaxial stretching rate of 50 to 200% per second, the thus formed tubular film has an elasticity higher than that of the tubular film obtained from the polystyrene mentioned in the previous paragraph and it is not broken or torn. Since the form of the tubular film which is being inflated is stable, the thickness of the resulting film is uniform, thus the operation can be carried out continuously in a stabilized state. Furthermore, the biaxial orienting effect is quite remarkable and considerable improvement in the mechanical properties of the film can be achieved.

The film as extruded and before stretching can be about 1 mm. to about 15 mm., preferably about 5 mm. to about 10 mm., thick. The extent of stretching in both the longitudinal or machine direction and the transverse direction can be sufficient to reduce the thickness of the film to about 1% to about 20% of its original thickness before stretching. For example, the extent of stretching in the longitudinal or machine direction can be adequate to increase the length of the film tube about 2 to about 10 times its original length as extruded and before stretching and the extent of stretching in the transverse direction can be adequate to increase the diameter of the film tube about 2 to about 10 times its original diameter as extruded and before stretching.

The film obtained in accordance with the present invention remains substantially transparent and is high in surface smoothness. On the other hand, the film obtained by a T-die process using the same rubber-modified polystyrene used in the present invention is not improved at all in the above-mentioned mechanical properties and is considerably lower in transparency and surface smoothness than the film obtained by the present invention.

As already described, the film obtained by the present invention is so widely adaptable to a broad range of thermoforming conditions and is so high in the thermoformability that it can be easily thermoformed with such inexpensive and widely used thermoforming machines as those of the radiation heating type.

Polystyrene film which is biaxially oriented by the tenter process is adaptable to only a very narrow range in the thermoforming conditions in the case of thermoforming it and is so low in thermoformability as to be difficult to thermoform with any such widely used thermoforming machine.

In order to clarify this point, the thermoformability in the present application and its measuring method shall be explained in the following with reference to FIGS. 2 to 5.

In FIG. 2, the temperature of the film at the time of thermoforming is shown on the abscissa and the ratio ($H/D$) of the maximum depth (H) in cm. to which the film can be formed without breaking to the diameter (D) in cm. of the thermoforming plug is shown on the ordinate. As described later, in the case of thermoforming the above-mentioned films, they begin to partially flow when they reach a certain temperature and become impossible to thermoform above that temperature. For example, in the case of Examples 1, 2 and 5, the films became impossible to form at about 130° C. as shown in FIG. 2.

It is evident that, as shown in FIG. 2, the wider the range of the thermoforming temperatures of the film when it is thermoformed and the larger the ratio $H/D$ in the above-mentioned thermoforming temperature range, that is, the larger the area enclosed within a given curve shown in FIG. 2 and the abscissa, the wider the range of thermoforming conditions, and that, even with some fluctuation of the thermoforming conditions, the film can be thermoformed continuously and easily and it is very effective in the thermoforming of deep drawn articles. Therefore, it can be readily seen that the film produced by the present invention has a much greater thermoformability than the biaxially oriented polystyrene film made by using the tenter process.

The apparatus shown in FIG. 3 comprises a set of clamping frames 2 having upper and lower plates for clamping a film 1 to be tested, a thermoforming plug 3 which is movable vertically up and down through the center part of the plane of the film 1 and is controllable in its distance of downward movement, heaters 4 which can uniformly heat from above and below the film 1 so that the film temperature may be raised to a given temperature and a supporting frame 5 for the heaters 4. The heaters 4 and supporting frame 5 are movable horizontally to right and left. As soon as the film reaches a given thermoforming temperature by the heater 4, the heater supporting frame 5 is moved to the left and then the thermoforming plug 3 is lowered to a fixed distance (H as shown in FIG. 5) and thermoforms the film as shown in FIG. 5.

FIG. 5 shows the position of the thermoforming plug 3 after it has been lowered to thermoform the film.

The data shown in the graph given in FIG. 2 were obtained by using films in the apparatus shown in FIGS. 3, 4 and 5 under the measuring conditions that the thickness of the film was 0.2 mm., the heated part of the film was a circular part of a diameter of 140 mm., the tip of the thermoforming plug 3 was a hemisphere of a diameter of 35 mm. and the lowering velocity of the thermoforming plug 3 was 50 cm./sec.

Inherently, it is considered very difficult to thermoform a biaxially oriented plastic film. That is to say, in the process of heating the above-mentioned plastic film and forming it under vacuum or compressed air by using a mold, that is, in thermoforming it, in order to form it faithfully with a mold, it is naturally necessary to heat the film to a temperature above its softening point.

However, when the film has been oriented in two directions (biaxially oriented), it has the property that, when the softening point of the film is reached as mentioned above, the film begins to shrink in the directions reverse to the directions in which it has been oriented.

Therefore, the film fixed with clamp frames 2 such as are shown in FIG. 3 reaches a thermoformable temperature with the progress of heating, then, after a while shrinks quickly as mentioned above, begins to flow partially, becomes irregular and nonuniform in the thickness and finally breaks.

In view of such phenomenon, in order to obtain a favorable thermoformed article, it is necessary to form the film with a mold during the period after the film reaches a thermoformable temperature but before it begins to partially flow (that is, in the thermoformable temperature range). This temperature range required for forming a conventional biaxially oriented film is so narrow that it has been very difficult heretofore to thermoform such film.

Therefore, the important significance of the present invention is in having solved this difficulty. The actual effects of the above described operation of the present invention resulting from our research are more clearly brought out in the later mentioned examples but the operating mechanism is not known in detail but is presumed to be that the rubber particles containing the rubber material and dispersed in the styrene polymer in the above-mentioned rubber-modified polystyrene are very likely to be oriented and are oriented more than the above-mentioned styrene polymer at the time when they are stretched and fixed in two directions in such amorphous linear polymer as the styrene polymer so that the biaxial orienting effect is remarkable and that, in the quantitative regulation of this rubber material and the regulation of the particle sizes of the rubber particles containing the rubber material, the mechanical properties can be much improved in accordance with the present invention.

In the same manner, it is presumed that the rubber particles containing the rubber material which ordinarily would obstruct the transparency and the surface smoothness are highly oriented and are presented in a flat state in the styrene polymer, the transparency and surface smoothness of films produced according to this invention are improved.

It is presumed that, in the same manner, in the case of thermoforming particles containing a rubber material, oriented more than the above-mentioned styrene polymer and presented in a flat state in the styrene polymer, the above-mentioned particles act to reduce the shrinkage of the film and improve the thermoformability.

The rubber-modified polystyrene film produced by the present invention is not only utilized in such fields as shrink packaging and shink overwraps for which conventional biaxially oriented films have been used but is also easily thermoformed with an ordinary thermoforming machine and is used for forming articles for various food containers, ice cream and frozen food containers and partitioned containers and has the advantages that the obtained formed articles are transparent, are high in surface smoothness and are excellent in the already described mechanical properties. Therefore, the practical value of the present invention is very high.

DESCRIPTION OF SPECIFIC EMBODIMENTS

The practice of the process of the present invention is further illustrated by the following examples. In the examples, all percentage are based on the total weight of the film unless otherwise specified and such mechanical properties as tensile strength, impact strength and tearing strength and transparency were tested as follows:

(1) The tensile strength was tested by the method described in ASTM D882–64T.
(2) The impact strength was tested by the DuPont impact testing method wherein the energy when a sample was 50% broken at a load of 250 g. by using an impact head having a ¼″ radius was measured in kg. cm. as the impact strength.
(3) The tearing strength was tested with an Elmendorf tearing strength tester which is described in ASTM D689–62 and by which the measured value was expressed as the tearing strength per unit thickness in kg./cm.
(4) The transparency was represented by the haze value measured with a haze tester.

The haze value is transparency indicating value obtained from the formula:

$$\text{Haze value (percent)} = \frac{T_1 - T_2}{T_1} \times 100$$

wherein $T_1$ is total transmittancy and $T_2$ is parallel transmittancy determined by measuring with a photocell the transmitted amount of light emitted from a fixed light source after passing through the sample. The smaller the value, the higher the transparency. But, when the haze value is less than 15%, it is considered to be favorable in transparency as viewed by naked eye.

EXAMPLE 1

A rubber-modified polystyrene composition was prepared from 0.3% polybutadiene rubber (based on the total weight of polybutadiene rubber and the total amount of polymerized styrene and grafting styrene onto the rubber in the final composition) having a Mooney of 55 (ML–4). The polybutadiene rubber was present in the form of a graft copolymer to which about 65% styrene based on the total weight of graft copolymer was grafted.

The rubber-modified polystyrene composition was prepared by well known method (for example, the method of Example 1 of U.S. Pat. 3,047,534 was applied. In our patent application, parts were made 0.3% in the final composition using the above described polybutadiene rubber in place of rubber composition in the said literature.) The resulting composition comprised polystyrene as a continuous phase with the graft copolymer of polybutadiene and styrene having a particle size of 3 to 5 microns dispersed throughout the polystyrene phase.

The above-described rubber-modified polystyrene composition was extruded as a tube of film at a temperature of 170° C. to 190° C. and having a film thickness of about 5 mm. before stretching. The tube was then stretched biaxially while at a temperature of about 100° C. to about 130° C. by expanding the tube with air and drawing it away from the extruder at a more rapid rate than it was being extruded. The tube diameter was 100 mm. before stretching and 500 mm. at its maximum after stretching. The stretching rate was about 50 to about 120% per second and the resulting film had a thickness of 0.2±0.02 mm. The extrusion operation was continuous and stable and the form of the expanded tube of film was also stable. Properties of the resulting biaxially oriented film are listed in the table below.

EXAMPLE 2

A rubber-modified polystyrene composition was prepared by dispersing 0.6% of a styrene-butadiene rubber (based on the total weight of rubber and polystyrene the total amount of polymerized styrene and grafting styrene onto the rubber in the final composition) containing 75% butadiene and 25% styrene and having a Mooney of 45 (ML–4) in polystyrene as a continuous phase. The rubber was present in the form of a graft copolymer to which about 65% styrene based on the total weight of graft copolymer was grafted. The rubber was dispersed at a particle size in the range of 1 to 3 microns in the polystyrene.

The rubber-modified polystyrene composition was prepared by well-known method (for example, the method of Example 1 of U.S. Pat. 3,047,534 was applied. In our patent application, parts were made 0.6% in the final composition using the above described polybutadiene rubber in place of rubber composition in the said literature.) The resulting composition was extruded and biaxially stretched in the same manner as described in Example 1 to produce a film having a thickness of 0.2±0.02 mm. The extrusion operation was continuous and stable and the form of the expanded tube of film was also stable. Properties of the resulting biaxially oriented film are listed in the table below.

EXAMPLE 3

A rubber-modified polystyrene composition was prepared from 1.5% polybutadiene rubber (based on the total weight of polybutadiene rubber and the total amount of polymerized styrene and grafting styrene onto the rubber in the final composition) having a Mooney of 55 (ML–4). The rubber was present in the form of a graft copolymer to which about 65% styrene based on the total weight of graft copolymer was grafted.

The rubber-modified polystyrene composition was prepared by well-known method (for example, the method of Example 1 of U.S. Pat. 3,047,534 was applied. In our patent application, parts were made 1.5% in the final composition using the above described polybutadiene rubber in place of rubber composition in the said literature.) The resulting composition comprised polystyrene as a continuous phase with the graft copolymer of polybutadiene and styrene having a particle size of 0.1 to 0.2 micron dispersed throughout the polystyrene phase.

The above-described rubber-modified polystyrene composition was extruded and biaxially oriented in the same manner as described in Example 1 to produce a film having a thickness of about 0.2±0.02 mm. The extrusion operation was continuous and stable and the form of the expanded tube of film was also stable. Properties of the resulting biaxially oriented film are listed in the table below.

EXAMPLE 4

A rubber-modified polystyrene composition was prepared by dispersing a styrene-butadiene block copolymer rubber which was "Cariflex KIOI" (Shell Co. Ltd). The styrene-butadiene block copolymer rubber was dispersed in an amount of 3.0% (based on the total weight of the block copolymer rubber and the poly styrene continuous phase in the final composition) by the following method: The styrene-butadiene block copolymer rubber and the polystyrene having a Melt Index of 0.2 gram per ten minutes (ASTM D1238–62T, condition E, temperature 190° C., load 2160 g.) were mixed and were extruded at an extrusion temperature of about 200° C. to about 220° C., to produce the granules of the rubber-modified polystyrene composition. The block copolymer rubber was dispersed at a particle size of 0.05 to 0.1 micron throughout the polystyrene phase.

The above-described rubber-modified polystyrene composition was extruded and biaxially oriented in the same manner as described in Example 1 to produce a film having a thickness of 0.2±0.02 mm. The extrusion operation was continuous and stable and the form of the expanded tube of film was also stable. The properties of the resulting biaxially oriented film are listed in the table below.

EXAMPLE 5

A rubber-modified polystyrene composition was prepared from 0.3% polybutadiene in the form of the graft copolymer as described in Example 1 and, in addition, 1.0% of the styrene-butadiene block copolymer rubber described in Example 4 was dispersed throughout the polystyrene continuous phase by the following method:

The rubber-modified polystyrene composition in Example 1, the styrene-butadiene block copolymer rubber in Example 4 and the polystyrene having a Melt Index of 0.2 gram per ten minutes (ASTM D1238–62T, condition E, temperature 190° C., load 2160 g.) were mixed and were extruded at an extrusion temperature of about 200° C. to about 220° C. to produce the granules of the rubber-modified polystyrene composition. The percentages of the polybutadiene rubber (as a component of the graft copolymer) and the block copolymer rubber given above are based on the total weight of the final rubber-modified polystyrene composition. The particle size of the graft copolymer dispersed throughout the polystyrene phase was about 3 to 5 microns and the particle size of the block copolymer rubber dispersed throughout the polystyrene phase was about 0.1 to about 0.2 micron.

The above-described rubber-modified polystyrene composition was extruded and biaxially oriented as described in Example 1 to produce a film having a thickness of 0.2±0.02 mm. The extrusion operation was continuous and stable and the form of the expanded tube of film was also stable. Properties of the resulting biaxially oriented film are listed in the table below.

EXAMPLE 6

(Comparative example)

This example does not illustrate the present invention but is given only for comparison purposes.

The same rubber-modified polystyrene composition as described in Example 1 was extruded through a T-die at an extrusion temperature of about 210° C. to about 220° C. to produce a film having a thickness of about 0.2±0.02 mm. The film was not stretched or oriented in any direction. Properties of the resulting non-oriented film are listed in the table below and illustrate the poor overall qualities of the film.

EXAMPLE 7

(Comparative example)

This example does not illustrate the present invention but is given only for comparison purposes.

A polystyrene composition containing no rubber was extruded and biaxially oriented under the same conditions as described in Example 1. While being oriented in the longitudinal (machine) direction and the lateral direction, the film broke and tore and the extruded tube was not at all stable in shape and form. It was attempted to produce a film having a thickness of about 0.2±0.02 mm. but the thickness of the film actually obtained fluctuated widely in an amount of about 0.16 to about 0.23 mm. Only about 20% of the film had a thickness of 0.2±0.02 mm. and the production efficiency therefore was quite low. In addition, the extrusion and biaxial orientation could not be easily conducted in a continuous and stable operational state. Properties of the resulting film are listed in the table below and illustrate that the tearing strength and impact strength of the film notably are unacceptable.

EXAMPLE 8

(Comparative example)

This example does not illustrate the present invention but is given only for comparison purposes.

The same rubber-modified polystyrene composition as described in Example 1 was extruded at an extrusion temperature of 210° C. to 220° C. in the form of a tube of film having a film thickness of about 5 mm. before stretching. The tube was then stretched biaxially while at a temperature of 140° C. to 180° C., by expanding the tube with air and drawing it away from the extruder at a more rapid rate than it was being extruded. The stretching rate was about 50 to 120% per second and the resulting film had a thickness of 0.2±0.02 mm. Properties of the resulting biaxially oriented film are listed in the table below and illustrate that the tearing strength and impact strength of the film notably are unacceptable.

EXAMPLE 9

(Comparative example)

This example does not illustrate the present invention but is given only for comparison purposes.

A rubber-modified polystyrene composition as described in Example 3 was extruded as a tube of film at a temperature of 170° C. to 180° C. and having a film thickness of about 2 mm. before stretching.

The tube was then stretched biaxially while at a temperature of 90° C. to 130° C., by expanding the tube with air and drawing it away from the extruder at a more rapid rate than it was being extruded. The tube diameter was 100 mm. before stretching and 300 mm. at its maximum after stretching. The stretching rate was about 10 to 40% per second and the resulting film had a thickness of 0.2±0.02 mm. Properties of the resulting biaxially oriented film are listed in the table below and illustrate that all mechanical properties of the film are unacceptable.

EXAMPLE 10

(Comparative example)

This example does not illustrate the present invention but is given only for comparison purposes.

A rubber-modified polystyrene composition was prepared from 1.8% polybutadiene rubber (based on total weight of polybutadiene and the total amount of polymerized styrene in the final composition) having a Mooney of 55 (ML–4). The polybutadiene rubber was present in the form of a graft copolymer to which about 65% styrene based on the total weight of graft copolymer was grafted.

The rubber-modified polystyrene composition was prepared by the following method (for example, the method of example 1 of U.S. Pat. 3,047,534 was applied. In our patent application, parts were made 1.8% in the final composition using the above described polybutadiene rubber in place of rubber composition in the said literature). The resulting composition comprised polystyrene as a continuous phase with the graft copolymer of polybutadiene and sytrene having a particle size of 1 to 3 microns dispersed through the polystyrene phase.

The above-described rubber-modified polystyrene composition was extruded and biaxially oriented in the same manner as described in Example 1 to produce a film having a thickness of 0.2±0.02 mm. Properties of the resulting biaxially oriented film are listed in the table below and illustrate low mechanical properties and notably an unacceptable transparency.

EXAMPLE 11

(Comparative example)

This example does not illustrate the present invention but is given only for comparison purposes.

A rubber-modified polystyrene composition was prepared from 0.5% of a polybutadiene rubber (based on the total weight of polybutadiene rubber and the total amount of polymerized styrene in the final composition) having a Mooney of 55 (ML–4). The polybutadiene rubber was present in the form of a graft copolymer to which about 65% styrene based on the total weight of graft copolymer was grafted.

The rubber-modified polystyrene composition was prepared by the following method (for example, the method of example 1 of U.S. Pat. 3,047,534 was applied. In our patent application, parts were made 0.5% in the final composition using the above described polybutadiene rubber in place of rubber composition in the said literature). The resulting composition comprised polystyrene as a continuous phase with the graft copolymer of polybutadiene and styrene having a particle size of 0.05 to 0.1 micron dispersed throughout the polystyrene phase.

The above-described rubber-modified polystyrene composition was extruded and biaxially oriented under the same conditions as described in Example 1 to produce a film having a thickness of about 0.2±0.02 mm. Properties of the resulting biaxially oriented film are listed in the table below and illustrate that the tearing strength and impact strength of the film notably are unacceptable.

TABLE

| Example No. | Mechanical properties | | | | Haze value (in percent) | Surface smoothness | Remarks |
|---|---|---|---|---|---|---|---|
| | Tensile strength (kg./cm.²) | Impact strength (kg./cm.) | Tearing strength (kg./cm.) | | | | |
| 1 | 635 | 628 | 3.4 | 6.4 | 5.8 | 5.0 | Excellent | Examples of the invention. |
| 2 | 620 | 622 | 3.8 | 7.0 | 6.2 | 9.8 | do | |
| 3 | 635 | 622 | 4.3 | 6.1 | 5.8 | 8.5 | do | |
| 4 | 583 | 580 | 5.6 | 6.5 | 6.0 | 12.0 | do | |
| 5 | 639 | 625 | 5.5 | 6.8 | 6.5 | 7.8 | do | |
| 6 | 497 | 408 | 0.6 | <0.5 | <0.5 | 8.0 | Good | |
| 7 | 612 | 605 | 1.7 | 2.9 | 3.7 | 5.8 | Excellent | |
| 8 | 560 | 572 | 2.0 | 2.0 | 1.8 | 5.4 | do | Comparative examples. |
| 9 | 480 | 477 | 1.5 | 1.2 | 1.3 | 10.2 | do | |
| 10 | 530 | 535 | 2.8 | 4.2 | 4.5 | 45.0 | Good | |
| 11 | 638 | 625 | 2.2 | 2.1 | 2.0 | 6.0 | Excellent | |
| Direction of the film | (¹) | (²) | (¹) | (²) | | | | |

¹ The machine direction.
² The transverse direction.

What is claimed is:

1. In a process for producing a rubber-modified, impact-resistant polystyrene film by extruding a composition containing a major amount of styrene and a minor amount of a polymeric conjugated diolefin rubber component as a tube of film and stretching said tube biaxially to orient said film, that improvement comprising, utilizing a composition containing an amount in weight percent, W, of said rubber component in the form of rubber-containing particles substantially uniformly dispersed throughout the styrene matrix and having a particle size, D micron ($\mu$), falling in the area of a biaxial logarithmic plot of W versus D defined by the lines $D=10.0$, $D=0.05$, $D=0.05W^{-1.86}$ and $D=2.0W^{-1.86}$, said rubber-containing particles being selected from the group consisting of:
  (A) a block copolymer of styrene and said conjugated diolefin;
  (B) a graft copolymer of styrene and a member selected from the group consisting of:
    (1) a homopolymer of said conjugated diolefin;
    (2) a copolymer rubber of said conjugated diolefin and styrene; and
    (3) a mixture of (1) and (2); and
  (C) a mixture of (A) and (B), extruding said composition as a tube of film at a temperature of about 160° C. to about 200° C.; and biaxially stretching said tube of film at a biaxial stretching rate of about 50% per second to about 200% per second while it is at a temperature of about 90° C. to 130° C.

2. Improved process as claimed in claim 1 wherein said composition contains an amount in weight percent, W of said rubber-containing particles having a particle size, D micron ($\mu$), falling in the area of a biaxial logarithmic plot of W versus D defined by the lines $D=10.0$, $D=1.0$, $W=0.2$, $W=0.5$ and $D=2.0W^{-1.86}$.

3. Improved process as claimed in claim 1 wherein said composition contains an amount in weight percent, W, of said rubber-containing particles having a particle size, D micron ($\mu$), falling in the area of a biaxial logarithmic plot of W versus D defined by the lines $D=0.5$, $D=0.05$, $W=0.5$, $W=1.5$, and $D=0.05W^{-1.86}$.

4. Improved process as claimed in claim 1 wherein said rubber component is a polybutadiene rubber in the form of a graft copolymer thereof with styrene.

5. Improved process as claimed in claim 1 wherein said rubber component is a styrene-butadiene rubber in the form of a graft copolymer thereof with styrene.

6. Improved process as claimed in claim 1 wherein said rubber component is a styrene-butadiene block copolymer rubber.

7. Improved process as claimed in claim 2 wherein said rubber component is a polybutadiene rubber in the form of a graft copolymer thereof with styrene.

8. Improved process as claimed in claim 3 wherein said rubber component is a polybutadiene rubber in the form of a graft copolymer thereof with styrene.

9. Improved process as claimed in claim 3 wherein said rubber component is a styrene-butadiene block copolymer rubber.

10. Improved process as claimed in claim 1 wherein said rubber component is a mixture of a styrene-butadiene block copolymer rubber and a polybutadiene rubber in the form of a graft copolymer thereof with styrene.

References Cited
UNITED STATES PATENTS

| | | | |
|---|---|---|---|
| 3,047,534 | 7/1962 | Dyer et al. | 260—880 |
| 3,341,643 | 9/1967 | Barnhart | 264—95 |
| 3,355,531 | 11/1967 | Barnhart et al. | 264—95 |
| 3,488,744 | 1/1970 | Nemphos et al. | 260—880 |

ROBERT F. WHITE, Primary Examiner

J. R. THURLOW, Assistant Examiner

U.S. Cl. X.R.

260—880; 264—89, 95, 210, 211, 289